June 2, 1925.
H. H. TREFFER
EGG TURNING DEVICE FOR INCUBATORS
Original Filed July 3, 1922
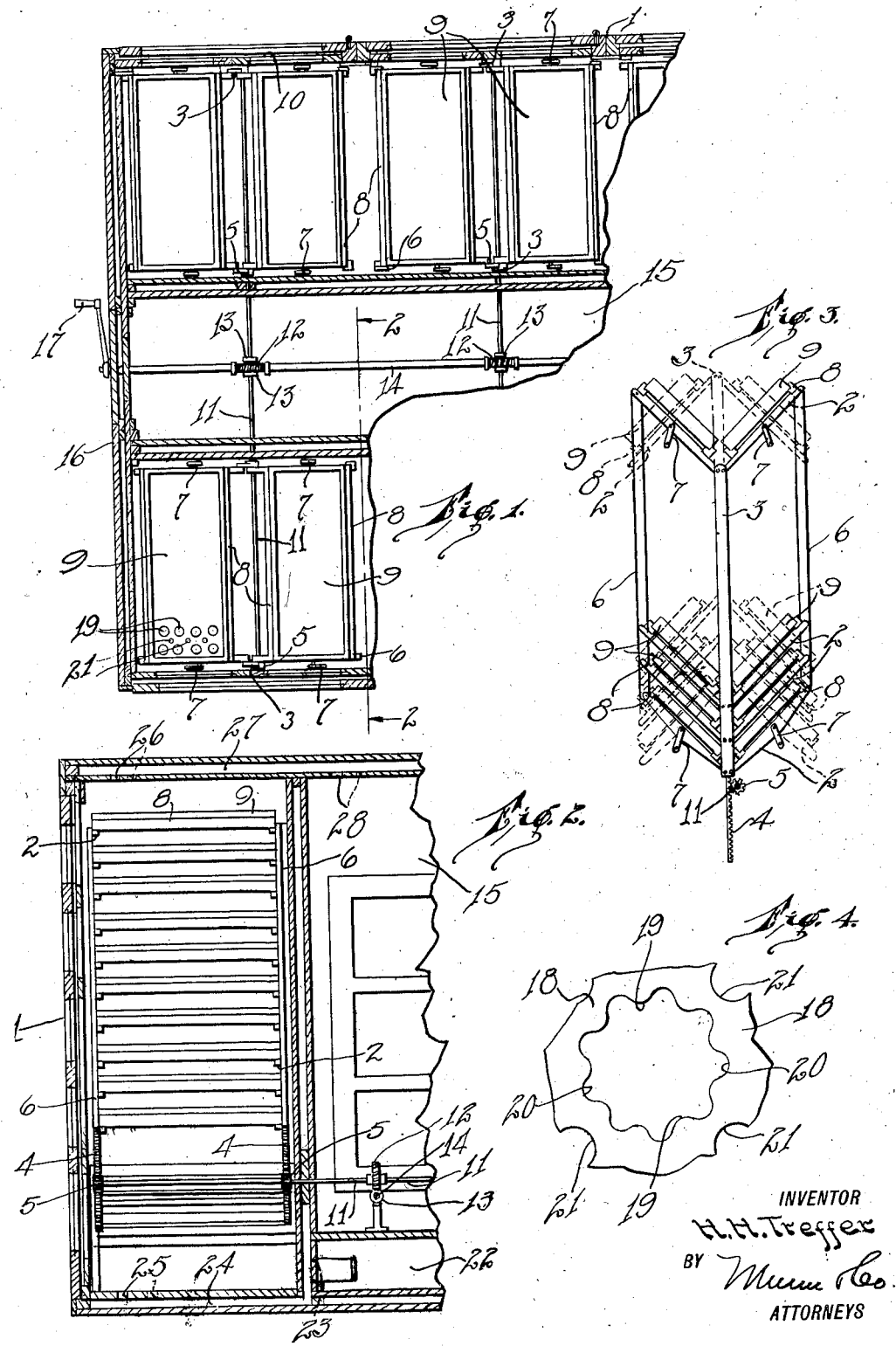
INVENTOR
H.H. Treffer
BY
ATTORNEYS Patented June 2, 1925.

1,540,199

UNITED STATES PATENT OFFICE.

HENRY H. TREFFER, OF DAVENPORT, IOWA.

EGG-TURNING DEVICE FOR INCUBATORS.

Original application filed July 3, 1922. Serial No. 572,503. Divided and this application filed January 27, 1923. Serial No. 615,349.

*To all whom it may concern:*

Be it known that I, HENRY H. TREFFER, a citizen of the United States, and a resident of Davenport, in the county of Scott and State of Iowa, have invented a new and useful Improvement in Egg-Turning Devices for Incubators, of which the following is a full, clear, and exact description.

My invention relates to improvements in egg turning devices for incubators, and it consists in the combinations, constructions, and arrangements herein described and claimed.

This application is a division of my co-pending application, Serial No. 572,503, filed July 3, 1922. In said prior application the egg turning device formed part of an incubator which was automatically controlled and which incubator formed the subject matter of the claims. The present application is directed to the egg turning device.

An object of my invention is to provide a device of the type described in which the trays are mounted in units and are operatively connected to each other, whereby any number of trays can be operatively connected together.

A further object of my invention is to provide a device of the type described which is adapted to tilt the eggs through an arc of ninety degrees.

A further object of my invention is to provide a device of the type described which is relatively simple in construction, and which is adapted to operate any number of trays.

Other objects and advantages will appear in the following specification, and the novel features of the invention will be particularly pointed out in the appended claim.

My invention is illustrated in the accompanying drawings forming part of this application, in which—

Figure 1 is a horizontal section of an incubator showing the egg turning device operatively applied thereto, Figure 2 is a section along the line 2—2 of Figure 1, Figure 3 is a diagrammatic view of one tier of trays, and Figure 4 is an enlarged view of one of the egg receiving openings.

In carrying out my invention I make use of an incubator indicated generally at 1. In the present instance the incubator is of the sectional type and is fully described and claimed in my co-pending application, Serial No. 572,503.

In Figure 1 I have shown three tiers of trays as being operatively connected to each other. It is obvious that as many tiers as desired may be connected to each other. Each of the tiers comprises a plurality of frames 2 which are pivotally connected at their inner ends to a vertical rod 3. It will be noted from Figure 3 that the rod 3 has a rack 4 at the lower end thereof which is in mesh with a pinion 5. The outer ends of the frames 2 are pivotally connected to each other by bars 6, (see Figure 2). There are two sets of frames in each tier, one set being disposed on each side of the rod 3. The top and bottom frames are supported by the links 7 which are pivotally secured to the centers of the frames and which are also pivotally secured to the wall of the incubator. It will therefore be observed from this construction that the trays are carried by the wall of the incubator and at the same time are adapted to be swung about the links 7 as a center. In Figure 3 I have shown the trays in one position, indicated by the full lines, and in another position as indicated by the dotted lines. The frames 2 carry channel irons 8 in which trays 9 are slidably disposed.

In the present form of the incubator I have shown doors 10 which are disposed adjacent to the tiers of trays 9 and which permit entrance of the operator into the incubator whereby he may readily remove the trays from the frames 2. In this manner any number of trays containing fresh eggs may be disposed in the incubator each day so as to have a predetermined number of chickens hatched from the eggs every day. In this manner the incubator is practically continuous in operation, i. e., a certain number of chickens are hatched every day. It is obvious that this number can be changed at will.

In Figures 1 and 2 I have shown the means by which the trays are tilted so as to turn the eggs. The pinions 5 which engage with the racks 4 are mounted on the transversely extending shafts 11. These shafts are provided with worm gears 12 which are in mesh with worms 13 that are carried by the longitudinal shaft 14. The shaft 14 is positioned in the central corridor 15 of the incubator 1 and extends through the end walls 16. An actuating handle 17 is secured to the end of the shaft 14 which projects through the wall 16. It is obvious, however, that the shaft 14 can be actuated by a motor if desired.

Each of the trays 9 is provided with a laminated egg supporting shelf 18 which is made of wood. The shelf 18 has egg receiving openings 19 therein of the shape shown in Figure 4. It will be noted from Figure 4 that the edge of the opening 19 is corrugated at 20 so as to provide air spaces between the shell of the egg and the edge of the opening. In addition to the air passages provided between the egg and the edge of the opening, I also provide small openings 21 through which the heated air is adapted to pass. The corrugated edge of the opening 19 and the openings 21 provide sufficient air openings between the eggs to effectually heat the entire egg. A tilting of the eggs causes the heated air to strike the other side of the egg, whereby the egg is uniformly heated throughout.

From the foregoing description of the various parts of the device, the operation thereof may be readily understood. In each form of the incubator shown in the present drawings, the heated air flows through the passageway 22, the openings 23, into the space 24, between the two floors, through the openings 25, up through the compartments containing the egg trays, through the openings 26, and out into the space 27 between the two ceilings of the incubator. From the space 27 the air flows through the openings 28 into the corridor 15 and back to the heating chamber, (not shown). In this manner the air is heated and is kept circulated so as to keep the eggs at a uniform temperature throughout the entire incubating period. In my co-pending application, Serial No. 572,503, I disclosed means for circulating the air through the compartments in which the egg trays are disposed and for diffusing the air so as not to subject the eggs to a draft.

The trays can be tilted into any angle desired by merely rotating the shaft 14 by means of the crank handle 17. The rotation of the shaft 14 causes the transversely extending shaft 11 to raise or lower the rods 3 by means of the pinions 5 and the racks 4. The raising of the rods 3 causes the trays 9 to swing into the opposite position, i. e., the full line position shown in Figure 3. As heretofore stated, all of the trays in the incubator are actuated by the single shaft 14, this shaft in turn being rotated from a position exterior of the incubator. It will therefore be apparent that it is not necessary to enter the incubator to turn the eggs. The device is very simple in operation and is thoroughly efficient for the purpose intended. It is adapted to be used for any number of trays since it is merely necessary to extend the shaft 14 and provide an additional shaft 11 for actuating the new set of trays.

I claim:

In a device of the type described, a vertically extending bar, a plurality of horizontally extending frames having their inner ends pivotally secured to said bar, and being disposed on each side of said bar, egg trays removably carried by said frames, the outer ends of said frames being operatively connected together, and links secured to certain of said frames and being adapted to support the frames.

HENRY H. TREFFER.